// United States Patent [15] 3,699,644
Cocca [45] Oct. 24, 1972

[54] METHOD OF DIVIDING WAFERS

[72] Inventor: Frank J. Cocca, East Boston, Mass.
[73] Assignee: Sylvania Electric Products Inc.

[22] Filed: Jan. 4, 1971
[21] Appl. No.: 103,583

[52] U.S. Cl. ........................29/527.2, 29/583, 225/2, 117/4, 117/6, 117/8, 117/101, 83/7, 83/14
[51] Int. Cl. ..........................................B23k 17/00
[58] Field of Search............29/580, 583, 183, 527.2; 225/2; 83/7, 14; 117/4, 6, 8, 101

[56] References Cited

UNITED STATES PATENTS

| | | | |
|---|---|---|---|
| 2,784,479 | 3/1957 | Roberts | 29/583 |
| 3,364,399 | 1/1968 | Warner | 29/580 |
| 3,359,132 | 12/1967 | Wittmann | 117/101 |
| 3,492,491 | 1/1970 | Beeh | 117/101 |

*Primary Examiner*—Charles W. Lanham
*Assistant Examiner*—W. Tupman
*Attorney*—Norman J. O'Malley, Elmer J. Nealon and Robert T. Orner

[57] ABSTRACT

A method of dividing silicon wafers includes the steps of marking a predetermined pattern on the wafer to be divided and applying a clear dielectric film over the marked surface thereof. The surface of the wafer is cut through the dielectric film along the pattern with the resulting debris being scattered over the protective film. The protective film along with the debris is then removed, for example, by washing in an appropriate solvent. The wafer is then broken along the cut surface for further processing.

2 Claims, 5 Drawing Figures

PATENTED OCT 24 1972 3,699,644

INVENTOR

Frank J. Cocca

By Robert T. Omer

Attorney

METHOD OF DIVIDING WAFERS

BACKGROUND OF THE INVENTION

This invention relates to methods of processing materials and in particular to a method of dividing a piece of electrostatically charged material.

In the manufacture of semiconductor electrical translating devices, such as diodes and transistors of well-known types, the active semiconductor elements are generally in the form of thin wafers which are subdivided into smaller elements known as "dice."

Conventional methods of dicing have been accomplished by scribing the surface of the wafer with a pointed tool in order to produce intersecting sets of grooves defining the edge boundaries of the dice and then breaking the wafer along the grooves. After reduction of the wafer to individual die, it is generally necessary to clean the dice to remove the small particles of silicon (commonly called "debris") that results from the scribing operation.

Because the surface of the silicon dice have an electrostatic charge associated therewith, the debris adheres to the surface of the dice even after vigorous ultrasonic washing. It would be advantageous to have and it is one of the objects of this invention to provide a method of scribing an electrostatically charged wafer and substantially reduce the problem of the subsequent removal of the resulting debris.

BRIEF SUMMARY OF THE INVENTION

A method according to the invention of dividing a wafer of material having an electrostatic charge on the surface thereof includes the steps of applying a transparent dielectric protective film over the surface of the wafer, cutting through the film into the surface of the wafer and removing the transparent dielectric film and resulting debris from the surface of the wafer. By employing a dielectric film over the electrostatically charged surface of the material, the debris is electrically isolated from the charged surface thus reducing the difficulty in its removal.

DESCRIPTION OF THE DRAWINGS

The method of dividing a piece of electrostatically charged material according to the invention will be more fully understood from the following detailed description taken in conjunction with the accompanying drawings wherein.

DETAILED DESCRIPTION OF THE INVENTION

Figure 1:
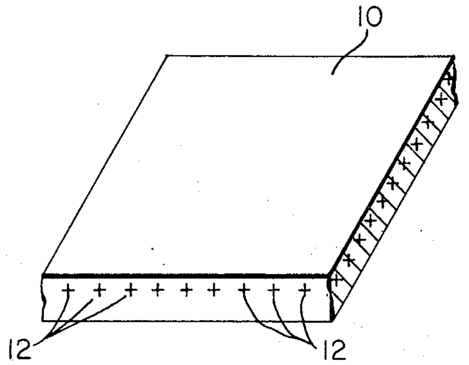
FIGS. 1 through 5 are perspective views in cross-section illustrating a fragment of a wafer of silicon material at various stages during the scribing process according to the method of the invention.
Figure 2:
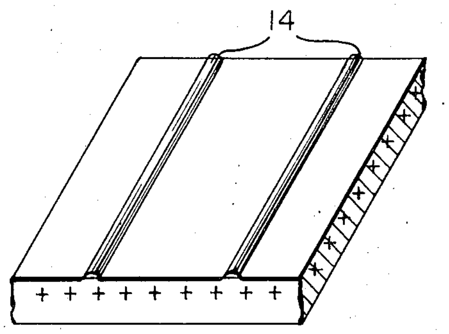
Figure 3:
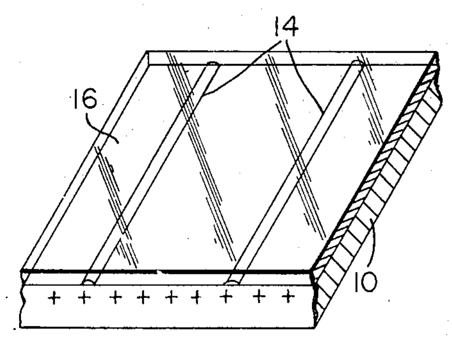

FIG. 1 illustrates a fragment of a substrate 10 which is a wafer of a material, for example silicon, having electrostatic charges 12 associated therewith. A method according to the invention of dividing the substrate 10 either by scribing or sawing includes a first step of marking scribe lines 14 on the substrate 10 as illustrated in FIG. 2. It is to be appreciated that if other means are available for controlling the pattern to be scribed the marking step may be omitted. The scribe lines 14 may be made in any well-known manner, for example, by depositing an opaque film such as a photoresist material on the surface of the substrate 10. As illustrated in FIG. 3, a clear dielectric film 16 is then applied over the entire surface of the substrate 10 to be scribed.

A dielectric material such as a photoresist material is applied, for example, with an eye dropper to the surface of substrate 10 which is mounted on a spinner (not shown). After covering the entire surface of the substrate 10 with the dielectric material, the substrate 10 is spun at a suitable speed, depending on the thickness of the dielectric film 16 desired, and baked for a predetermined time to allow for proper curing and adhesion. By way of example, a substrate having on one surface a dielectric material AZ-1350H, manufactured by Shipley Co., Newton, Massachusetts, being spun at a speed of 2,000 rpm for 30 seconds and being baked at a temperature of 85°C for 15 minutes has a dielectric film of approximately 1 micron thick. It is to be understood that the actual thickness of the dielectric film 16 is not critical.

Figure 4:
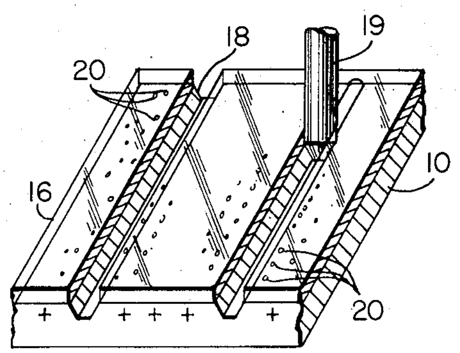

Next the surface of the substrate 10 and the dielectric film 16 are scribed along the marker lines to form channels 18 in the dielectric film and the surface of substrate 10 as illustrated in FIG. 4. The scribing operation is performed by known techniques, for example, by the use of a diamond scribing tool 19 or laser machining apparatus (not shown). The debris, illustrated as a plurality of small black dots 20 on the surface of the dielectric film 16, resulting from the cutting action is isolated from the electrostatic charge at the surface of the substrate 10 by the dielectric film 16. Furthermore, the protective film serves to cushion the scribing action thus reducing the shattering of the substrate surface along the edge of the channel cut by the scribing tool 19.

Figure 5:
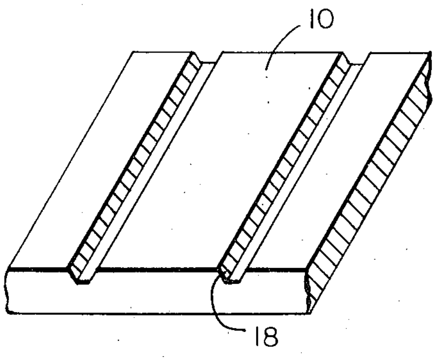

Next the protective dielectric film 16, along with the debris 20 on the surface thereof, is removed from the substrate 10 as illustrated in FIG. 5. One known technique for removing the dielectric film 16 and the debris 20 is by washing the substrate in a jet stream of acetone or by well-known ultrasonic techniques. Since the debris is on the surface of the film 16 and not on the electrostatically charged surface of the silicon wafer, it is easily removed during the washing step. The scribed wafer can then be broken into dice for further processing.

While there has been shown and described what is considered a preferred embodiment of the present invention, it will be obvious to those skilled in the art that various modifications and changes may be made therein without departing from the invention as defined in the appended claims.

What is claimed is:

1. A method of dividing a wafer of material having an electrostatic charge associated therewith including the steps of:

applying a dielectric protective film over a surface of the wafer to be divided including the steps of applying a liquid dielectric material on the surface of the wafer, spinning the wafer to obtain substantially a uniform distribution and a predetermined thickness of the dielectric material on the surface of the wafer, and baking the wafer at an elevated temperature for a period of time to cure the dielectric material, cutting through the film into the surface of the wafer, and removing said dielectric film and the resulting debris from the wafer.

2. A method of scribing a wafer of material having an electrostatic charge associated therewith including the steps of:

applying a liquid dielectric material on the surface of the wafer, spinning the wafer to obtain substantially a uniform distribution and a predetermined thickness of the dielectric material on the surface of the wafer, baking the wafer at an elevated temperature for a period of time to cure the dielectric material into a film over the surface of the wafer, scribing through the film into the surface of the wafer, and washing the dielectric film from the surface of the wafer whereby the debris resulting from the scribing step is also removed from the surface of the wafer.

* * * * *